(12) United States Patent
Wang

(10) Patent No.: US 8,219,688 B2
(45) Date of Patent: Jul. 10, 2012

(54) METHOD, APPARATUS AND SYSTEM FOR SERVICE SELECTION, AND CLIENT APPLICATION SERVER

(75) Inventor: Liangwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 12/190,792

(22) Filed: Aug. 13, 2008

(65) Prior Publication Data
US 2008/0313273 A1 Dec. 18, 2008

Related U.S. Application Data

(63) Continuation of application No. PCT/CN2007/071399, filed on Dec. 29, 2007.

(30) Foreign Application Priority Data

Apr. 28, 2007 (CN) .......................... 2007 1 0097238

(51) Int. Cl.
*G06F 15/16* (2006.01)
*G06F 15/177* (2006.01)
(52) U.S. Cl. ........ 709/227; 707/100; 709/119; 709/220; 709/221; 709/222
(58) Field of Classification Search ........... 709/227–229
See application file for complete search history.

(56) References Cited

U.S. PATENT DOCUMENTS

| | | | |
|---|---|---|---|
| 5,388,147 A | 2/1995 | Grimes | |
| 6,549,922 B1 | 4/2003 | Srivastava et al. | |
| 6,594,700 B1 * | 7/2003 | Graham et al. | 709/230 |

(Continued)

FOREIGN PATENT DOCUMENTS

CN 1407496 A 4/2003

(Continued)

OTHER PUBLICATIONS

Yang et al., "Integration Approach of Distributed Network Resource and Service Management," *Computer Engineering*, 3(7): 100-102, 111 (Apr. 2006).

(Continued)

*Primary Examiner* — Haresh N Patel
*Assistant Examiner* — Evans Desrosiers
(74) *Attorney, Agent, or Firm* — Leydig, Voit & Mayer, Ltd.

(57) ABSTRACT

A service selection method, apparatus and system, as well as a client application server are provided. The method includes: obtaining meta information according to contents specified by a client; requesting to query services matched with the meta information to obtain a service list including service identifications of the services matched with the meta information; converting the service list into a format recognizable by the client and providing the converted service list to the client; obtaining a corresponding service identification according to acknowledgement information from the client; requesting interface and address information of a service server corresponding to the corresponding service identification, and providing the interface and address information to the client. In this way, services capable of processing current contents may be found according the contents, and an appropriate service may be selected among the services.

22 Claims, 5 Drawing Sheets

U.S. PATENT DOCUMENTS

| | | |
|---|---|---|
| 7,200,387 B1 | 4/2007 | Ephraim et al. |
| 2003/0084096 A1 | 5/2003 | Starbuck et al. |
| 2003/0101258 A1 | 5/2003 | Parham |
| 2004/0064428 A1 | 4/2004 | Larkin et al. |
| 2004/0172376 A1 | 9/2004 | Kobori et al. |
| 2006/0161563 A1* | 7/2006 | Besbris et al. ............... 707/100 |
| 2007/0160033 A1 | 7/2007 | Bozinovski et al. |

FOREIGN PATENT DOCUMENTS

| | | |
|---|---|---|
| CN | 1588369 A | 3/2005 |
| CN | 1934839 A | 3/2007 |
| CN | 101072116 A | 11/2007 |
| RU | 2280274 C2 | 7/2006 |
| WO | WO 02/093289 A2 | 11/2002 |

OTHER PUBLICATIONS

State Intellectual Property Office of the People's Republic of China, Examination Report in Chinese Patent Application No. 200710097238.0 (May 27, 2010).

The Federal Service for Intellectual Property, Patents and Trademarks, Decision on Granting for Russian Patent Application No. 2008137258/09(047901) (Jun. 3, 2010).

State Intellectual Property Office of the People's Republic of China, English Translation of Written Opinion of the International Searching Authority in International Patent Application No. PCT/CN2007/071399 (Apr. 10, 2008).

European Patent Office, Office Action in European Patent Application No. 07846225.6 (Mar. 6, 2012).

* cited by examiner

METHOD, APPARATUS AND SYSTEM FOR SERVICE SELECTION, AND CLIENT APPLICATION SERVER

CROSS-REFERENCE TO RELATED APPLICATION

This application is a continuation of International Patent Application No. PCT/CN2007/071399, filed Dec. 29, 2007, which claims priority to Chinese Patent Application No. 200710097238.0, filed Apr. 28, 2007, both of which are hereby incorporated by reference in their entirety and for everything they describe and teach.

FIELD OF THE INVENTION

The invention relates to the field of communication technologies, and in particular, to a method, apparatus, and system for service selection, and a client application server.

BACKGROUND OF THE INVENTION

Opened networks are flooded with a large quantity of contents, such as music, video, pictures, address information, various forms, product information, text description, and geographical locations. Accordingly, there are a lot of services for processing these contents, such as ring tone setting, color ring setting, picture transmission, video sharing, location identifying, product querying, and schedule setting, in the opened networks. These contents and services in the networks are generally developed and published by different entities, and may be added, modified and cancelled dynamically.

Currently, in Internet or telecommunication networks, a user generally selects the services, for processing relevant contents, by two ways. One way is that the user first selects and performs a service capable of processing a certain type of contents, and selects among the certain types of contents according to the program logic of the service. The other way is that the user first finds a certain type of contents or an identification of the certain type of contents, then selects an appropriate service to process the certain type of contents. For the latter way, there are two implementation manners in the conventional technology, which are as follows:

Implementation Manner 1: The user may select an appropriate service according to a postfix of a file bearing the contents, because most of the operation systems of mobile terminals or desktop computers have file management functions and thereby allow the user to configure programs for processing the file. For example, the user may select a picture from a resource manager, and choose, by use of a right key of a mouse, one program from processing programs such as picture editing, picture displaying, and picture transmission via email.

Implementation Manner 2: A user may view a certain type of contents by a browser, and the browser may invoke a file processing component of a local operation system to automatically perform a service for processing the certain type of contents. For example, when the user is viewing an MP3 (MPEG-1 audio Layer 3) file via a browser, the browser may invoke a file processing component in a local operation system, to automatically perform an MP3 player program.

During the process of forming the invention, the inventor has discovered, via investigation, that the above conventional technology solutions all depend on local operation systems, and therefore are applicable only when the local operation systems have the programs capable of processing the contents. However, with the development of software services, more and more contents processing services are provided by application servers in the opened networks. In this case, the above conventional technology solutions cannot select, over the networks, the service servers capable of processing the corresponding contents.

SUMMARY OF THE INVENTION

Embodiments of the invention provide a method, apparatus, and system for service selection, and a client application server, to find service servers capable of processing current contents according to the current contents, and select an appropriate service server from the found service servers to process the current contents.

The technical solutions according to the embodiments of the invention may be as follows.

A service selection method includes:
obtaining meta information according to contents specified by a client;
requesting to query services matched with the meta information, to obtain a service list including service identifications of the services matched with the meta information;
converting the service list into a format recognizable by the client and providing the converted service list to the client;
obtaining a corresponding service identification according to acknowledgement information from the client; and
requesting interface and address information of a service server corresponding to the corresponding service identification, and providing the interface and address information to the client.

A service selection apparatus includes a service selection agent, a service selection server, a meta information registration server and a central controller.

The service selection agent is adapted to obtain meta information according to contents specified by a client, convert a service list into a format recognizable by the client and provide the converted service list to the client and obtain a corresponding service identification according to acknowledgement information from the client; request interface and address information of a service server corresponding to the corresponding service identification, and provide the interface and address information to the client.

The service selection server is adapted to send user identification and meta information received from the service selection agent to the meta information registration server via the central controller, requesting the service list based on the contents specified by the client, and send the service list to the service selection agent.

The meta information registration server is adapted to query services matched with the meta information, obtain the service list including service identifications, and send the service list to the service selection server via the central controller.

The central controller is adapted to control requests of the servers, and information transmission between the servers.

A service selection system includes a client application server, a service selection apparatus, and a service registration server. The service selection apparatus includes a service selection agent, a service selection server, a meta information registration server and a central controller.

The service selection agent is adapted to obtain meta information according to contents specified by a client, convert a service list into a format recognizable by the client and provide the converted service list to the client and obtain a corresponding service identification according to acknowledgement information from the client; request interface and address information of a service server corresponding to the corresponding service identification, and provide the interface and address information to the client.

The service selection server is adapted to send user identification and meta information received from the service selection agent to the meta information registration server via the central controller, requesting the service list based on the contents specified by the client, and send the service list to the service selection agent.

The meta information registration server is adapted to query services matched with the meta information, obtain the service list including service identifications, and send the service list to the service selection server via the central controller.

The central controller is adapted to control requests of the servers, and information transmission between the servers.

A client application server includes the following:

A transmitting unit, adapted to transmit a service selection request, a selection result, and a service request.

A receiving unit, adapted to receive information carrying a service list, and interface and address information of service servers.

A selection unit, adapted to select an appropriate service according to the information carrying the service list, and send the selection result to the transmitting unit.

A request generation unit, adapted to generate a service selection request according to specified contents, generate a service request according to the interface and address information of service servers, and send the service selection request and the service request to the transmitting unit.

In the embodiments of the invention, corresponding meta information may be found according to user specified contents, an appropriate service may be found to process the contents by matching the services with the meta information. In the embodiments of the invention, services capable of processing corresponding contents may be selected over network, and an appropriate service may be chosen according to the various meta information of contents and the user's preference.

DETAILED DESCRIPTION OF THE EMBODIMENTS

Embodiments of the invention are described below in conjunction with the accompanying drawings.

In the embodiments of the invention, meta information of contents in a network is analyzed, and services are matched with the meta information. In this way, a content service requestor may find services capable of processing contents according to the contents, and request an appropriate service to process the contents.

The meta information refers to any information describing characteristics of the contents, such as classification, format, author, date and field. The meta information may be directly provided by contents providers, or may be extracted from the contents according to the characteristics, such as labels of service providers and users, or common formats of the contents.

The implementations of the technical solutions of the invention are described below.

Figure 1:
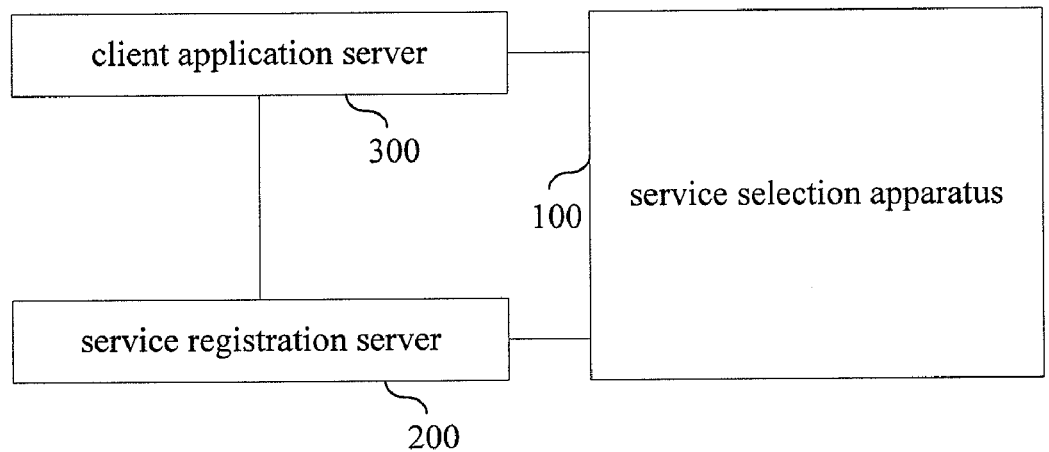
FIG. 1 is a schematic diagram illustrating the structure of a service selection system according to an embodiment of the invention.

To enable service selection over a network, a service selection system is provided in the network. FIG. 1 is a schematic diagram illustrating the structure of a service selection system according to an embodiment of the invention. As shown in FIG. 1, the service selection system includes a service selection apparatus 100, a service registration server 200, and a client application server 300. The service registration server 200 is connected with the service selection apparatus 100 and the client application server 300 respectively, and is adapted to save information of services in the network, such as interface, provider, and address of service server, and is adapted to provide registration and query functions. The client application server 300 may also be connected to various contents servers and various service servers, and is adapted to provide user specified contents to the service selection apparatus 100. The client application server 300 is also adapted to receive a selectable service menu sent from the service selection apparatus 100, to feed acknowledge information of the user back to the service selection apparatus 100, to receive interface and address information of a service server obtained by the service selection apparatus 100 according to the acknowledge information, and initiates a service request according to the interface and address information. The service selection apparatus 100 is adapted to find corresponding meta information according to the user specified contents, to match services with the meta information to find a list of services capable of processing the user specified contents, and to provide the list to the user, so that the user may select an appropriate service from the list.

Figure 2:
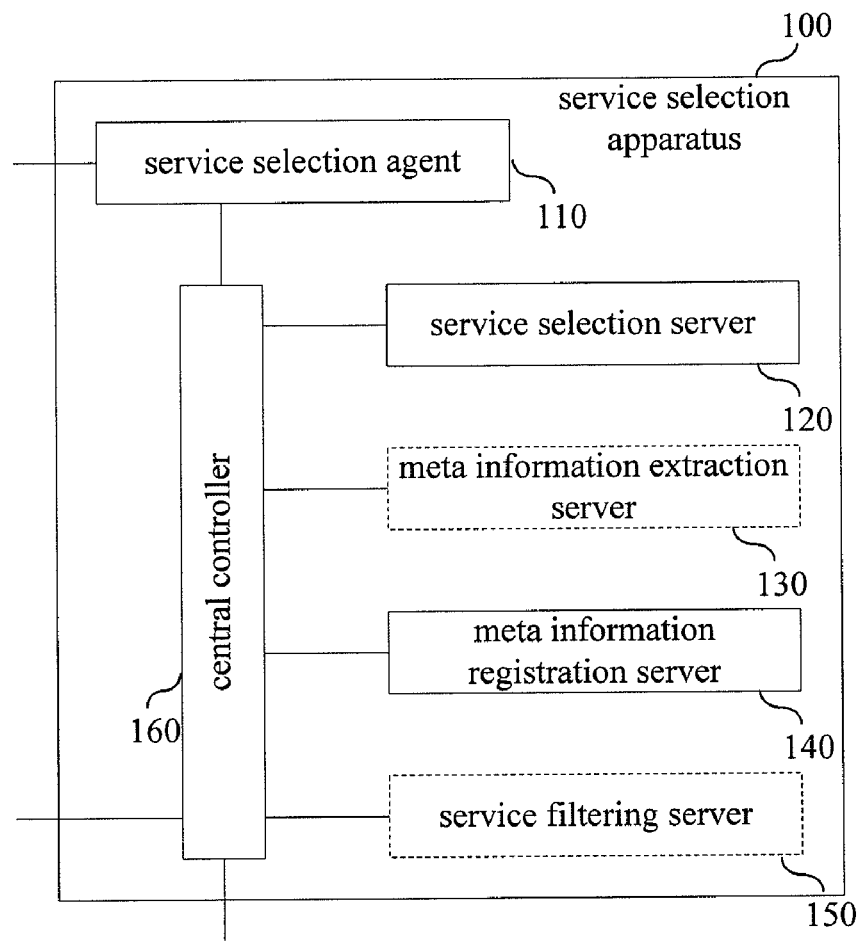
FIG. 2 is a schematic diagram illustrating the structure of a service selection apparatus according to an embodiment of the invention.

FIG. 2 is a schematic diagram illustrating the structure of a service selection apparatus according to an embodiment of the invention. As shown in FIG. 2, the service selection apparatus 100 includes: a service selection agent 110, a service selection server 120, a meta information registration server 140, and a central controller 160. In addition, the service selection apparatus 100 may further include a meta information extraction server 130 and/or a service filtering server 150.

A service selection process via the service selection apparatus 100 is as follows:

The service selection agent 110 saves user identification included in a service request, obtains meta information according to specified contents of a client, and sends the user identification and the specified contents to the service selection server 120 via the central controller 160. The service selection server 120 sends the user identification and the specified contents to the meta information registration server 140 via the central controller 160, requesting to query services matched with the meta information, obtain a service list including identifications of the services, and sends the service list to the service selection agent 110. The service selection agent 110 converts the service list into a format recognizable by the client and provides the converted service list to the client, and obtains an identification of a corresponding service according to acknowledge information from the client. The service selection agent 110 sends the identification of the service to the service registration server 200 via the central controller 160 to request interface and address information of a server providing the service, and sends the obtained interface and address information to the client.

It should be noted that, when the specified contents do not include description of the meta information, the service selection agent 110 predefines a field to be used as content characteristics for each known format, extracts the field, and sends the field with the user identification to the meta information extraction server 130 via the central controller 160 to obtain the meta information, and sends the obtained meta information to the service selection server 120 via the central controller 160.

When the user has configured a service filtering, the service selection server 120 sends the obtained service list to the service filtering server 150 via the central controller 160. The service filtering server 150 filters the service list to obtain a filtered service list, and sends the filtered service list to the service selection server 120 via the central controller 160.

Figure 3:
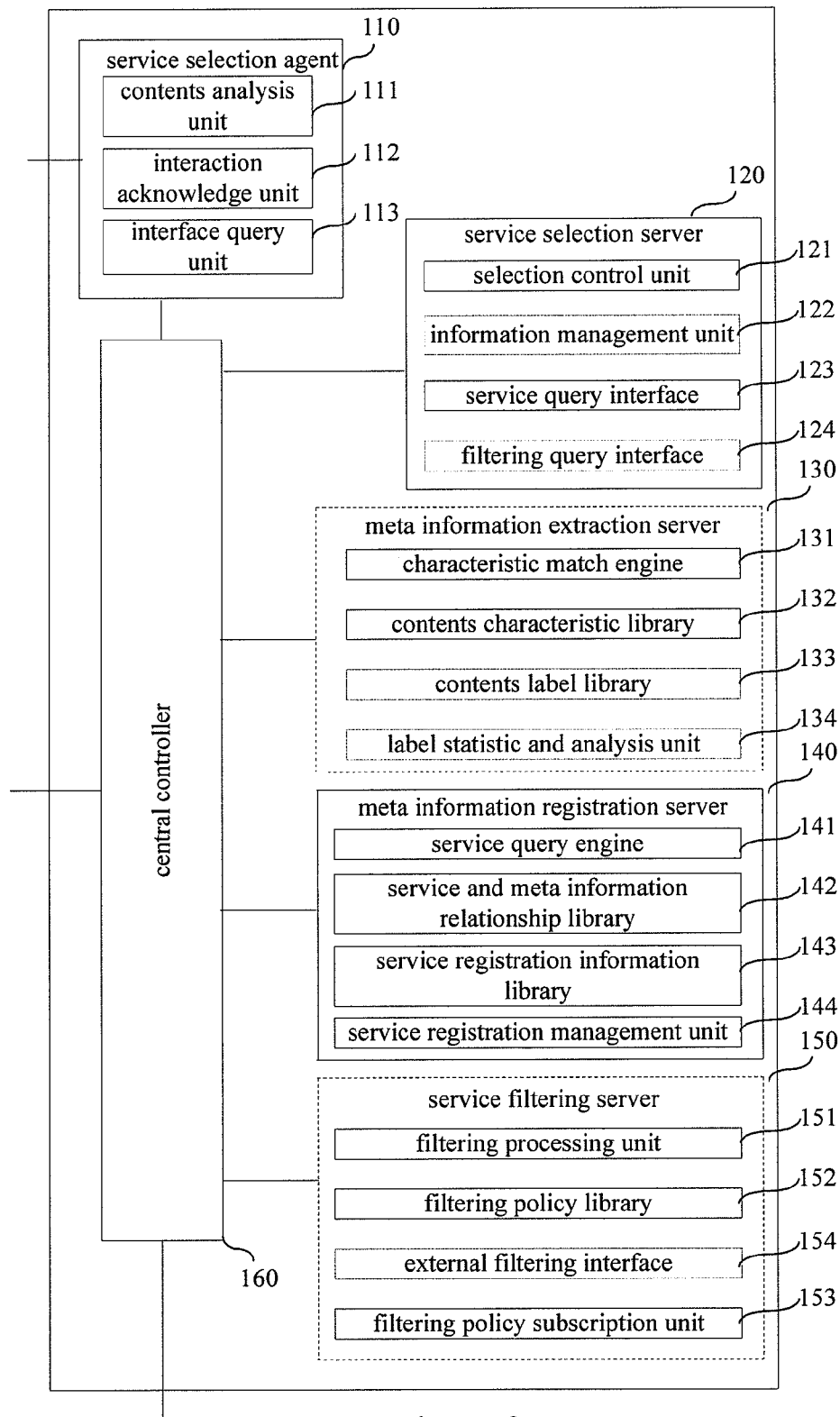
FIG. 3 is a schematic diagram illustrating the structure of a service selection apparatus according to another embodiment of the invention.

FIG. 3 is a schematic diagram illustrating the structure of a service selection apparatus according to another embodiment of the invention. The components of the service selection apparatus as shown in FIG. 3 are described below.

1. The service selection agent 110 may include a contents analysis unit 111, an interaction acknowledge unit 112, and an interface query unit 113.

The contents analysis unit 111 is adapted to collect and analyze specified contents. Particularly, the contents analysis unit 111 obtains the specified contents according to a contents selection request initiated by a client; and analyzes the specified contents. If the specified contents include meta information description, the contents analysis unit 111 extracts the meta information and sends the meta information to the meta information registration server 140. If specified contents do not include meta information description, there are fields, used as content characteristics, which are predefined for each known format, the contents analysis unit 111 extracts and sends the fields to the meta information extraction server 130. The contents analysis unit 111 may include a variety of processing sub-units, each of the sub-units is adapted to obtain the required fields as content characteristics according to each known format. For example, the contents analysis unit 111 may include three processing sub-units for extracting the required fields from the syntax formats of Hyper Text Markup Language (HTML), eXtensible Markup Language (XML), and Embedding RDF in XHTML (RDFa), thereby forming the content characteristics of Resource Description Framework (RDF).

The interaction acknowledge unit 112 is adapted to convert the service list obtained by the service selection server 120 into a format recognizable by the client, send the converted service list to the client, receive acknowledge information from the client and obtain an identification of a corresponding service from the acknowledge information. For example, the user may select and acknowledge services via the client in various interactive manners, such as menu selection. The client may also initiate a re-query request. For example, the client may reinitiate a service selection request after adding a new label and modifying a filtering policy.

The interface query unit 113 is adapted to send a request to the service registration server 200 via the central controller 160 according to the identification of the service acknowledged by the client, so as to obtain interface and address information of a server providing the service, and send the interface and address information to the client. The client may initiate a service request according to the interface and address information.

It should be noted that the contents analysis unit 111, the interaction acknowledge unit 112, and the interface query unit 113 may be configured in a separate server, such as a web-page server. Or all or a part of the contents analysis unit 111, the interaction acknowledge unit 112, and the interface query unit 113 may be configured at the client side, for example, as plug-in modules of an Internet Explorer (IE) of the client.

2. The service selection server 120 may include a selection control unit 121, and a service query interface 123. The service selection server 120 may further include an information management unit 122, and a filtering query interface 124.

The selection control unit 121 is adapted to control the process of service selection, may read user configuration information according to user identification and determine whether a filtering processing is required according to the user configuration information.

The service query interface 123 is adapted to send user identification and meta information to the meta information registration server 140 and send a service list, including identification and basic description information of each service, to the service selection agent 110, under the control of the selection control unit 121.

The information management unit 122 is adapted to save and manage the user configuration information about service selection.

The filtering query interface 124 is adapted to send the service list to the service filtering server 150, when the selection control unit 121 reads the user configuration information saved in the information management unit 122 according to user identification and determines that the user has configured a service filtering, to filter the services, thereby obtaining a filtered service list.

3. The meta information extraction server 130 may include a characteristic match engine 131, and a content characteristic library 132. The meta information extraction server 130 may further include a contents label library 133 and a label statistic and an analysis unit 134.

The content characteristic library 132 is adapted to save and manage the relationship between meta information and content characteristics, including querying meta information according to the content characteristics and configuring the relationship between the content characteristics and the meta information.

The characteristic match engine 131 is adapted to match a content characteristic and user identification with the relationship between the content characteristics and the meta information saved in the content characteristic library 132, and send a match result to the service selection server 120 via the central controller 160.

The contents label library 133 is adapted to save and manage the relationship between the content characteristics and label information, including querying label information according to user identification and content characteristic and labeling the content characteristic. The label information may be relevant labels for content characteristics provided by a user, a service provider, a contents provider or other users. The label information may be a non-standard meta information description.

The label statistic and analysis unit 134 is adapted to perform a statistic on labels and language analysis manners of a number of persons to correspond the labels to the meta information registered by services, to establish a relationship between the label information and the meta information registered by the services. The meta information registered by the services is the information indicating which contents may be processed by the services.

Accordingly, the characteristic match engine 131 is further adapted to query the contents label library 133 according to user identification and content characteristic, obtain relevant label information, and match the relevant label information with the meta information registered by the services to obtain the corresponding meta information.

4. The meta information registration server 140 may include a service query engine 141, a service and meta information relationship library 142, a service registration information library 143, and a service registration management unit 144.

The service registration information library 143 is adapted to save and manage service identifications and basic description information, and provide a function for querying basic description information of a service according to service identification. The service identification may be a Universally Unique Identifier (UUID) allocated in the service registration server 200, or may be a Uniform Resource Locator (URL) of a service. Alternatively, the service registration information library 143 may provide only a query interface to the service registration server 200 to obtain the basic description information of a service by querying the service registration server 200.

The service and meta information relationship library 142 is adapted to save and manage the relationship between services and meta information.

The service query engine 141 is adapted to match meta information with the relationship saved in the service and meta information relationship library 142, search for services matched with the meta information according to a match result, find basic description information corresponding to the services in the service registration information library 143, and send a service list, including identification and basic description information of each of the services, to the service selection server 120 via the central controller 160.

The service registration management unit 144 is adapted to provide an interface for registration of meta information of services. Service servers pre-register meta information of services via the interface.

5. The service filtering server 150 includes a filtering processing unit 151, a filtering policy library 152, and a filtering policy subscription unit 153. The service filtering server 150 may further include an external filtering interface 154.

The filtering policy subscription unit 153 is adapted to configure a personal filtering policy of a user. For example, the filtering policy may be based on personal utilization frequency, popularity of services or recommended services configured by a server recommender trusted by the user, etc.

The filtering policy library 152 is adapted to save the personal filtering policy of a user.

The filtering processing unit 151 is adapted to control the process of service filtering. The filtering processing unit 151 reads the personal filtering policy of a user from the filtering policy library 152 according to user identification, query various information in the service list according to the filtering policy, and filter the service list according to the query result to obtain appropriate services from a number of possible services, generate a new service list, and sort the information in the new service list.

The external filtering interface 154 is adapted to provide an interface to external filtering services. A service list is sent to an external filtering service via the interface. An external filtering server filters the service list according to a predefined filtering policy, and returns a filtered service list via the interface.

6. The central controller 160 is a master unit in the service selection apparatus 100. The central controller 160 is adapted to control requests of the servers in the service selection apparatus 100 and information transmission between the service registration server 200 and the servers in the service selection apparatus 100.

Figure 4:
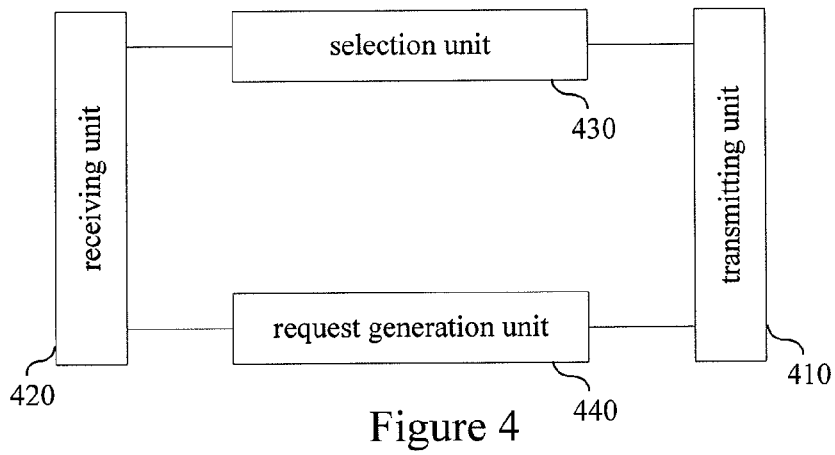
FIG. 4 is a schematic diagram illustrating the structure of a client application server according to an embodiment of the invention.

FIG. 4 is a schematic diagram illustrating the structure of a client application server according to an embodiment of the invention. As shown in FIG. 4, the client application server includes a transmitting unit 410, a receiving unit 420, a selection unit 430, and a request generation unit 440.

The transmitting unit 410 is adapted to transmit a service selection request provided by the request generation unit 440, a selection result provided by the selection unit 430, and a service request provided by the request generation unit 440.

The receiving unit 420 is adapted to receive information carrying a service list, and interface and address information of service servers.

The selection unit 430 is adapted to select an appropriate service according to the information carrying the service list, and send the selection result to the transmitting unit 410. For example, the selection unit 430 may select a menu option number according to a service menu.

The request generation unit 440 is adapted to generate a service selection request according to user specified contents, generate a service request according to the interface and address information of service servers, and send the service selection request and the service request to the transmitting unit 410.

Figure 5:
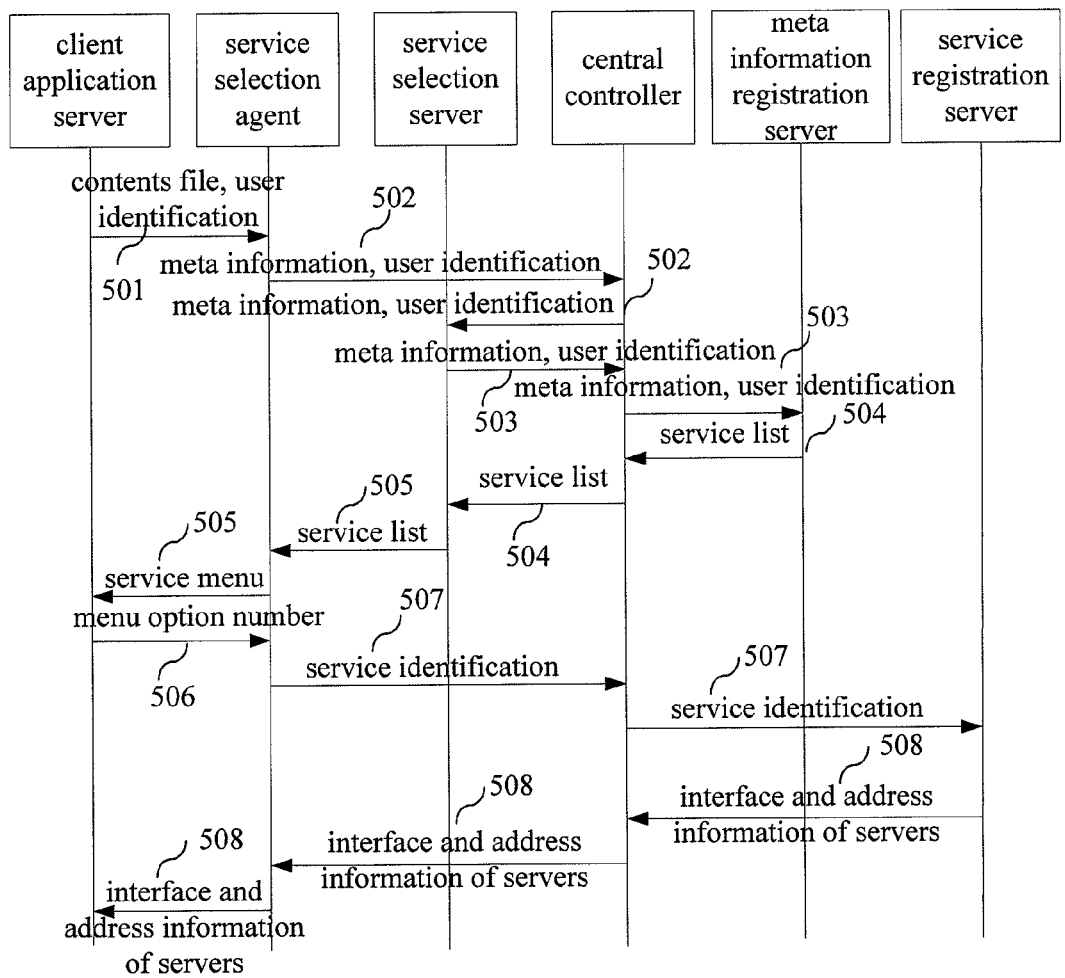
FIG. 5 is a flow chart illustrating a service selection method according to an embodiment of the invention.

FIG. 5 is a flow chart illustrating a service selection method according to an embodiment of the invention. As shown in FIG. 5, the service selection method is as follows.

In step 501, the service selection agent saves user identification, and obtains meta information of specified contents.

The service selection agent saves the user identification included in a service request. The user identification may be a character string or digital number uniquely representing a user.

The service selection agent obtains corresponding contents specified by a client, reads meta information in the contents according to the format of the contents, and converts the meta information into a standard meta information description. For example, the service selection agent may convert RDFa into RDF format through Gleaning Resource Description from Dialects of Languages (GRDDL).

In step 502, the service selection agent sends the meta information and the user identification to the service selection server via the central controller.

In step 503, the service selection server sends the meta information and the user identification to the meta information registration server via the central controller, requesting to query services matched with the meta information.

In step 504, the meta information registration server queries services matched with the meta information, obtains a service list including service identifications and basic description information of the services, and sends the service list to the service selection server via the central controller.

In step 505, the service selection server sends the service list to the service selection agent. The service selection agent converts the service list into a format recognizable by the client, e.g. a webpage with script, and sends the converted service list to the client.

In step 506, the user selects and acknowledges services via the client in various interactive manners, for example, in a menu selection manner.

In step 507, the service selection agent obtains a corresponding service identification of a service according to a menu option number acknowledged by the client, and sends the service identification to the service registration server via the central controller, requesting interface and address information of a server providing the service.

In step 508, the service registration server sends the interface and address information of the server providing the service to the service selection agent via the central controller. The service selection agent sends the interface and address information to the client. So, the client may initiate a service request according to the interface and address information.

Figure 6:
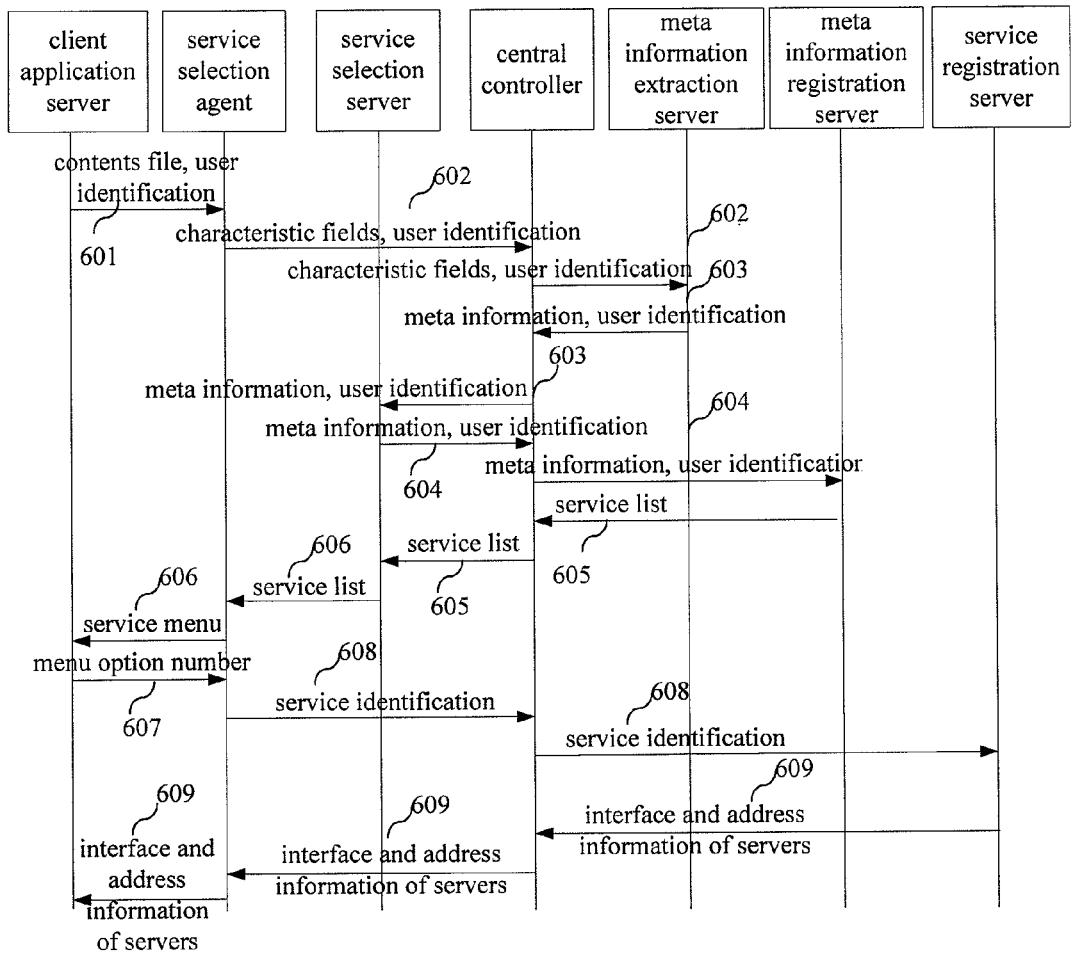
FIG. 6 is a flow chart illustrating a service selection method according to another embodiment of the invention.

FIG. 6 is a flow chart illustrating a service selection method according to another embodiment of the invention. As shown in FIG. 6, the service selection method is as follows.

In step 601, the service selection agent saves user identification, and obtains meta information of specified contents.

The service selection agent obtains corresponding contents specified by a client, and obtains the format of the specified contents, predefines some fields as content characteristics for each known format, and analyzes whether the specified contents include recognizable meta information description. The meta information description may be in a format of RDFa semantic description, or may be in a format predefined by HTML or XML.

If the specified contents include no meta information description, the service selection agent saves the predefined fields representing the content characteristics. For example, in the case of webpage contents, the service selection agent extracts information such as the web address and webpage blocks corresponding to the specified contents. In the case of Joint Photographic Experts Group (JPEG), the service selection agent extracts information such as file name, coding header.

In step 602, the service selection agent sends the fields and the user identification to the meta information extraction server via the central controller.

In step 603, the meta information extraction server obtains corresponding meta information according to the fields, and sends the meta information and the user identification to the service selection server via the central controller.

Particularly, the meta information extraction server queries whether the content characteristics are general characteristics of the type of contents format. For example, in the type of webpage contents, <img src> represents that the contents are certain pictures. In the case of multimedia file header, the meta information extraction server parses the file header according to encoding standards to obtain the meta information. The relationship between the general characteristics of contents formats and the meta information may be configured in advance by a system manager.

However, the amount of meta information extracted from the general characteristics is small. The meta information server may further obtain the relationship between meta information and content characteristics preconfigured in the content characteristic library according to the user identification, search for user-preconfigured content characteristics matched with the content characteristics, and obtain relevant labels. For example, a user can label a book list page of a book sale website which the user often visits, by labeling the fields including book name, author, price, and publisher, etc. If discovering no label of the user, the meta information extraction server may query whether there are any labels, made by a server provider, a contents provider or other users, matched with the content characteristics, and obtain corresponding meta information by performing a statistic on labels of many people and language analysis.

In step 604, the service selection server sends the obtained meta information to the meta information registration server via the central controller, requesting to query services matched with the meta information.

In step 605, the meta information registration server queries services matched with the meta information, obtains a service list including service identifications and basic description information of the services, and sends the service list to the service selection server via the central controller.

Particularly, the meta information registration server first queries, according to the meta information, whether there are services meeting match conditions of the meta information. In the meta information registration server, there is saved the match relationship between services and meta information. The match relationship describes the match conditions of meta information which the services can process. For example, the meta information of the contents which ServiceA may process is required to conform to the following expression:

$$((metaA=xx) \text{or} (metaD>=xx)) \text{and} (metaB \text{ include } xx) \text{and} (metaC \text{ includeString}(xx))$$

In the expression, metaA represents the type of meta information, xx represents the value of meta information. During the process of match, the meta information registration server may facilitate the query by querying its own library, to obtain a more intelligent match by use of its reasoning function. Naturally, the meta information registration server may query by only the expression.

The relationship between services and meta information includes: relationship between meta information and particular services (a particular service may a frequently used service or a subscribed service) configured in the service selection apparatus; relationship between meta information and services registered to the service selection apparatus by service providers; and relationship between meta information and services, frequently used by the users, registered to the service selection apparatus by users.

It should be noted that a user may specify the nature of these relationships as public or private. The meta information registration server may perform a statistic and analysis on the public relationship, to obtain general match relationship of different credibility. The user may also obtain an individualized service look-up according to the private relationship.

The meta information registration server queries basic description information and service identifications of services meeting the match conditions according to the match result, and forms a server list.

In the meta information registration server, there is saved the basic description information of services and service identifications allocated to the services in the service registration server. When registering relevant meta information of a service, the basic description information and identification of the service may be registered to the meta information registration server. In a particular implementation, the meta information registration server may query the basic description information of a service from the service registration server according to the identification of the service. The meta information registration server may query content characteristics which a service can process according to the meta information. The content characteristics are registered in the meta information registration server in the form of combination of logic expressions of meta information.

In step 606, the service selection agent converts the service list sent from the service selection server into a format recognizable by the client, e.g. a webpage with script, and sends the converted service list to the client.

In step 607, the user selects and acknowledges services via the client in various interactive manners, for example, in a menu selection manner.

In step 608, the service selection agent obtains a corresponding service identification of a service according to a menu option number acknowledged by the client, and sends the service identification to the service registration server via the central controller, requesting interface and address information of a server providing the service.

In step 609, the service registration server sends the interface and address information of the server providing the service to the service selection agent via the central controller. The service selection agent sends the interface and address information to the client. So, the client may initiate a service request according to the interface and address information.

Figure 7:
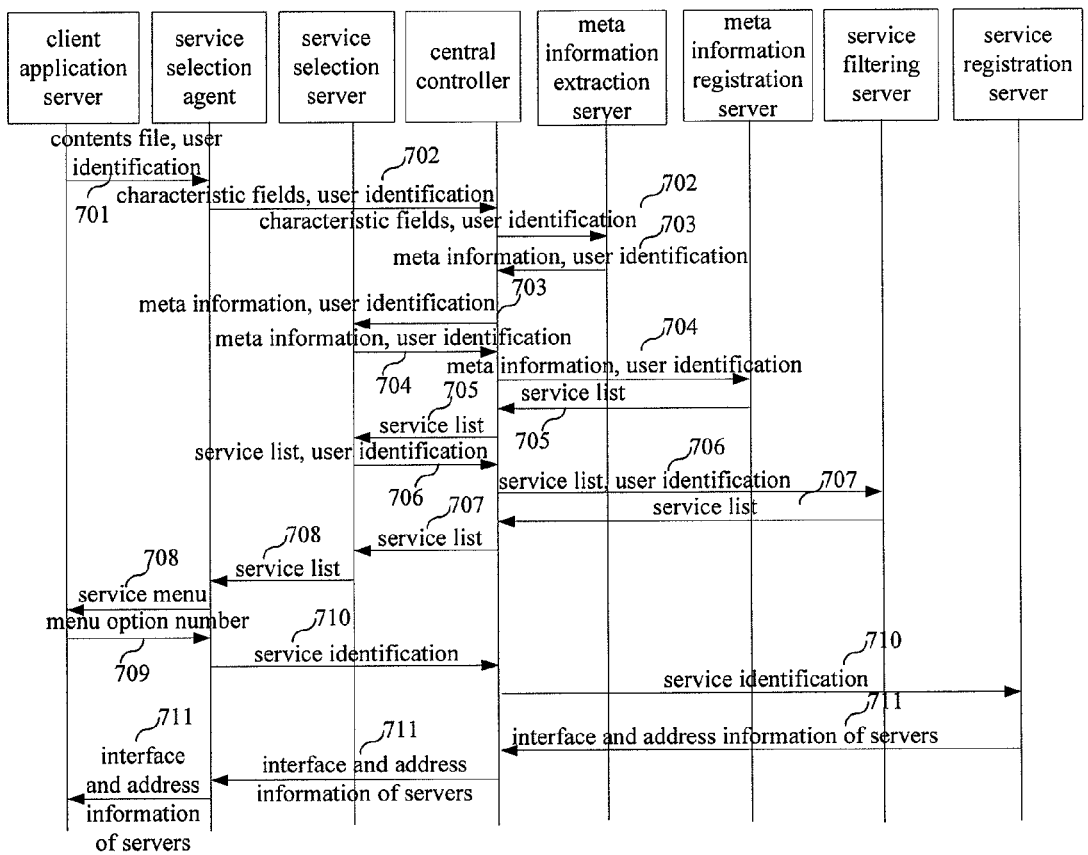
FIG. 7 is a flow chart illustrating a service selection method according to yet another embodiment of the invention.

FIG. 7 is a flow chart illustrating a service selection method according to yet another embodiment of the invention. As shown in FIG. 7, the service selection method is as follows.

Step 701 to step 705 are the same as the step 601 to step 605 as shown in the above embodiment, and are not repeated herein.

In step 706, the service selection server reads user configuration information according to the user identification. The service list is required to be sent to the service filtering server via the central controller, because a service filtering has been configured by the user.

In step 707, the service filtering server filters the service list sent from the service selection server, obtains a filtered service list, and sends the filtered service list to the service selection server via the central controller.

The service filtering server reads a personal service filtering policy according to the user identification. The user may configure a personal service filtering policy in advance in the service filtering server, according to, for example, personal utilization frequency, popularity of services, certain service filtering policies provided by the service selection apparatus, or any combination thereof. The personal service filtering policy may also be the profession, preference, and resident city, etc. selected by the user. The service filtering server may obtain the types of services by performing a statistic and analysis to service description, to customize an appropriate service filtering policy for the user. For example, the service filtering server may query personal utilization frequency, popularity, and types of services in the service list according to the personal service filtering policy of the user, and filter and sort the service list according to the query result.

In step 708, the service selection agent converts the filtered service list sent from the service selection server into a format recognizable by the client, and sends the converted service list to the client.

Step 709 to step 711 are the same as the step 607 to step 609 as shown in the above embodiment, and are not repeated herein.

It shall be appreciated by a person skilled in the art that all or part of the steps in the above methods according to the embodiments may be implemented via relevant hardware instructed by programs. The programs may be stored in a computer readable medium, such as ROM/RAM, disc, and optical disc.

The invention is further illustrated below with reference to some particular examples.

Embodiment 1

Figure 8:
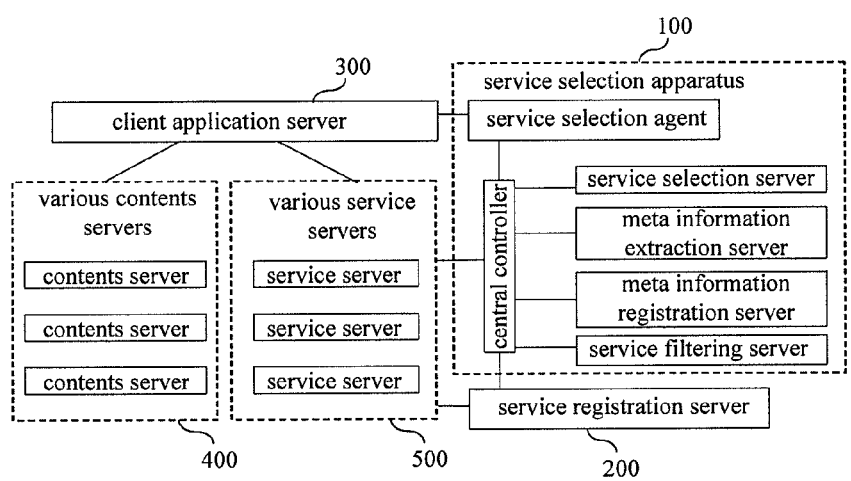
FIG. 8 is a schematic diagram illustrating the structure of a service selection system in an embodiment of the invention.

FIG. 8 is a schematic diagram illustrating the structure of a service selection system in an example of the invention. As shown in FIG. 8, the service selection system may include a service selection apparatus 100, a service registration server 200, a client application server 300, and various contents servers 400 and various service servers 500 connected therewith. In a network including the service selection system, when a user accesses contents over the network in a certain manner, for example, when the user finds a link for a certain song in a music searching, an email or a webpage, the user may select a service among services associated with the song provided in the network. The services associated with the song may include, for example, setting as ring tone, setting as a color ring, recommending to a friend, viewing lyric of the song, and viewing a Music Television Video (MTV).

1. Contents Analysis Step

Suppose that a user has registered in the service selection apparatus and has obtained user identification. The user identification may be identification allocated by an information management unit in the service selection server, or may be some existing identification such as a personal mobile telephone number.

When the user logs on, the service selection agent obtains the user identification. When reading a webpage including music contents via a client, the user may wish to do some processing to the music contents which cannot be done by the website providing the webpage. The service selection agent may obtain corresponding contents according to an operation specified by the user. If the music contents are described in an RDFa format, the relevant meta information is as follows:

```
<ul>
    <li about="/user/david/music/23456">
        <img src=" /user/david/musiccoverimg/23456" />
        <span property="dc:title">exampleMusic </span>
    <span property="dc:Format "> mp3</span>
        Creator
        <a rel="dc:creator"
    href="http://example.personal.com/David ">
    David
        </a>
        <a rel="dc:singer"
    href="http://example.personal.com/Palm ">
    David
     </a>
        licensed under a
     <a rel="cc:license"
            href="http://creativecommons.org/licenses/by-nc/2.5/">
            Creative Commons Non-Commercial License
        </a>
    </li>
</ul>
```

The service selection agent may obtain, by analysis, meta information such as the name, format, creator, singer, and license of the music contents. It should be noted that the embodiments of the invention impose no limit to the manners for describing the meta information. In addition to the RDFa format, the meta information may also be described in other appropriate manners.

The meta information is saved as follows:

```
< /user/david/music/23456>dc:title "exampleMusic" XMLLiteral
< /user/david/music/23456>dc: Format "mp3" XMLLiteral
< /user/david/music/23456> dc:creator http://
example.personal.com/David
< /user/david/music/23456> dcterm:singer http://
example.personal.com/Palm
</user/david/music/23456>cc:license
http://creativecommons.org/licenses/by-nc/2.5/Non-Commercial
```

If the webpage does not include any meta information, for example, in the following forms:

```
http:// musicsite.example.com/music.aspx ? music_id=xxxx925,
description information pieces of music are as follows:
    <li class="li" style="margin-right:10px;">
    <ahref="http:/musicsite.example.com/user/david/musiccoverimg/
       23456.mp3"    target="_blank">
http://musicsite.example.com/user/david/musiccoverimg/23456.mp3</a>
</li>
<div class="right_right">
    <div class="right_title"><b> exampleMusic </b></div>
    <div class="right_desc">
        <ul>
            <li >composer : David </li>
            <li>singer Palm</li>
            <li>publisher : CC publisher </li>
            <li>publication date : 2007-1-1</li>
        </ul>
    </div>
</div>
```

The service selection agent sends the webpage url:http://musicsite.example.com, the above HTML description of information pieces, and the user identification to the meta information extraction server.

2. Meta Information Extraction Step

This step is optional, and is executed only when the webpage does not include the meta information. The meta information extraction server extracts meta information according to the user identification and content characteristics sent from the service selection agent.

First, the meta information extraction server queries whether the content characteristics are general characteristics.

<a href="http:/musicsite.example.com/user/david/music-coverimg/23456.mp3" target="_blank"> is a general characteristic. It may be determined that the format of the contents is MP3 according to filename postfix in the href link. The meta information is described as follows:

</user/david/music/23456>dc: Format"mp3"^^XMLLiteral

The meta information extraction server obtains, according to the user identification, a relationship between meta information and content characteristics preconfigured in a content characteristic library by the user. If discovering that the user does not make any label to the webpage of the website http://musicsite.example.com, the meta information extraction server queries whether there are any other labels, provided by a service provider, a contents provider, or other users, matched with the content characteristics. Supposing that the website or contents provider of the music contents has labeled the meta information corresponding to the above webpage structure of HTML description in the embodiment of the invention and the meta information is saved in the meta information extraction server, the meta information extraction server may obtain a standard description of the music contents as follows:

```
Prefix : musicsitetag=http://musicsite.example.com
    < /user/david/music/23457> musicsitetag : song name
    "exampleMusic"^^XMLLiteral
    < /user/david/music/23457> musicsitetag: composer
    http://example.personal.com/David
    < /user/david/music/23457> musicsitetag : singer
    http://example.personal.com/Palm
```

The meta information extraction server may obtain a standard description of the meta information as follows by use of a standard dictionary:

```
< /user/david/music/23457>dc:title "exampleMusic"^^XMLLiteral
< /user/david/music/23457> dc:creator http://
example.personal.com/David
< /user/david/music/23457> dcterm:sniger http://
example.personal.com/Palm
```

Supposing the website http://musicsite.example.com declares that the contents are original, and registers to the meta information extraction server that the contents may be copied, distributed and transmitted over network, the meta information extraction server obtains the meta information as follows according to web address information:

</user/david/music/23457>cc:license http://creativecommons.org/licenses/by-nc/2.5/to Share The meta information extraction server sends the obtained meta information to the service selection server via the central controller.

3. Service Query Step

The service selection server sends the obtained meta information to the meta information registration server via the central controller, querying services matched with the meta information.

In the meta information registration server, there is a saved match relationship between services and meta information. The saving of the match relationship is illustrated with an color ring service as an example:

```
http://www.comtel.com/corlorring/ :
    (dc : license
    range="http://creativecommons.org/licenses/by/2.5/
    value=NonCommercial# Nonexist")
    AND
    (dc :format range="http:// service.scomtel.com/auodiformat" )
``` in which a service provider registers sound files such as MP3\WMA\RM, which a service server can process, as the definition of http://services.telcom.com/auodiforma.

The meta information registration server finds an MP3 music file "23457," which may be transmitted over a network, meeting the conditions of the color ring service according to the meta information obtained in the meta information extraction step. The meta information registration server further queries basic description information, which is as shown in Table 1 below, of the color ring service, and inserts the basic description information to the service list.

TABLE 1

| Service address | Service provider | Service description | Service label |
|---|---|---|---|
| http://www.comtel.com/corlorring/ | Comtel corp. | http://www.comtel.com/wsdl/corlorring.wsdl | Color ring subscription |

Supposing that a service of ring tone download requires MP3 format the allowance to copy distribution, the music file "23457" meets the conditions of the service of ring tone download. In this way, a service list as shown in Table 2 is obtained:

TABLE 2

| Service address | Service provider | Service description | Service label |
|---|---|---|---|
| http://www.comtel.com/corlorring/ | Comtel corp. | http://www.comtel.com/wsdl/corlorring.wsdl | Color ring subscription |
| http://www.comtel.com/ringing/ | Comtel corp. | http://www.comtel.com/cgi | Ring tone download |
| http://www.comA.com/lyric/ | A corp. | http://www.comA.com/cgi | Lyric viewing |
| http://www.comB.com/lyric/ | B corp. | http://www.comA.com/cgi | Lyric viewing |
| http://www.othercom/serviceX/ | Other corp . . . | Other . . . | Service X . . . |

4. Service Filtering Step

The service filtering step is optional. When reading user configuration according to the user identification and finding that the user has configured a service filtering, the service selection server sends the service list obtained in the service query step to the service filtering server via the central controller, to filter services. If the user has not configured a service filtering, the service filtering step is not executed.

The service filtering server reads a personal service filtering policy according to the user identification. Supposing that the user has configured the personal service filtering policy in the service filtering server that the filtering may be done according to recent personal utilization frequency and popularity of services, the service filtering server reads the utilization frequency and acknowledged statistic of each server in the service list, and queries 5 most optimal services. The query result may be that the services, such as lyric viewing, color ring subscription, ring tone download, and song lookup provided by company A, are frequently used by the user or popular services, and that the services, such as forwarding recommendation, and song lookup provided by company B, are seldom accessed. The service filtering server filters and sorts the service list according to the query result, and generates a filtered service list as shown in Table 3 below:

TABLE 3

| Service address | Service provider | Service description | Service label |
|---|---|---|---|
| http://www.comtel.com/ringing/ | Comtel corp. | http://www.comtel.com/cgi | Ring tone download |
| http://www.comtel.com/corlorring/ | Comtel corp. | http://www.comtel.com/wsdl/corlorring.wsdl | Color ring subscription |
| http://www.comA.com/lyric/ | A corp. | http://www.comA.com/cgi | Lyric viewing |
| http://www.other.com/service1 | Other corp1 | Other1 | Service 1 |
| http://www.other.com/service2 | Other corp2 | Other2 | Service 2 |

5. Service Selection and Acknowledgement

The service selection agent converts the filtered service list into a webpage with script and sends the webpage with script to the client. The user selects and acknowledges services via the client in a menu selection manner.

When the user acknowledges a service of color ring subscription via the client, the service selection agent sends the acknowledgement result to the service selection server. The service selection server queries interface and address of information of a server providing the service of color ring subscription to the service registration server according to a service identification http://www.comtel.com/corlorring/ acknowledged by the client, and sends the interface and address information to the client. Therefore, the client may initiate a service request according to the interface and address information.

In addition, the service selection server may send an acknowledged statistic to the service filtering server, so that the service filtering server may modify statistic data of the service of color ring subscription.

Embodiment 2

When a user reads information of some interested products in a webpage, the user may indirectly compare the products with products of other manufacturers, view comments on the products, and save the information in a personal folder, or the user may consult the providers of the products via telephone by way of "click-to-dial." Though the website of the providers of the products may provide the above services, the application of a service selection apparatus may be more appropriate in many scenarios. For example, a user may have a preferred product comparison service, and a product comment service and wishes to utilize these services directly; a user may have a product information library of his own and does not wish to be limited by the shopping cart of an electronic business website; or the website of a product provider publishes only its telephone number, but does not support the click-to-dial service.

Suppose a segment of hot line information description in a contacting information webpage, i.e. http://www.bookstore-example.com/info.htm, is as follows:

```
<tr>
    <td height="27" align="left">
<div align="center">
        <p align="center"><font
            style="color:#666666">service hot line :
010-xxxxxxx</font></p>
        </div>
    </td>
</tr>
```

A product comparison service registers the meta information of the content characteristics of these products into the service registration server, including labeling the classification information as book products to a segment of a product index webpage, i.e. http://www.bookstoreexample.com/index4mai.htm, in a website. The service registration server indexes the product comparison server into meta information of product classifications, and registers these characteristics of the webpage into the meta information extraction server.

A network dialing service labels the classification of information of the hot line in the contacting information webpage http://www.bookstoreexample.com/info.htm as a telephone number. Naturally, it may also be supposed that the website itself writes the classification of the information of the telephone number in the webpage, for example, as follows:

```
<p align="center"><font style="color:#666666">service hot line :
<span property="contact:tel"> 010xxxxxxx </span>
</font></p>
```

In addition, it is supposed that the user has associated the user identification with his/her mobile telephone number in the network dialing service.

The user configures service filtering policies, such as product comparison service A and comment service B, for different product classes in the service filtering server via the service selection agent. The user may configure the service filtering policy for the telephone number as a network dialing service provided by the operator of a network in which the user's mobile phone resides.

1. When the user looks through products, the user requests the service selection agent to select a service. For example, the service selection agent may be a plug-in of a browser, and the user may select a link of product information by use of a mouse.

The service selection agent first analyzes relevant meta information, and sends the location of the link and link character string in the webpage and the webpage URL to the meta information server as the content characteristics. The meta information extraction server returns meta information of the contents classified as book product information.

The service selection agent sends the user identification and meta information, i.e. type of book product information and the link to the book product information, to the service selection server. The service selection server requests the meta information registration server to obtain a service list related with the contents type of the product information. The service filtering server filters the service list according to the user identification, and returns to the service selection agent a filtered service list including the product comparison service A and the comment service B. The service selection agent converts the filtered service list into a webpage with script and sends the webpage to the client.

When the user chooses the product comparison service A, the service selection agent generates a request configuration interface according to request parameter configuration registered by the product comparison service A, to allow the user to select among request parameters, and returns a request message to the client. For example, the request parameters may be registered by the product comparison service A, and may include comparison options, such as comparison of the same type of products with similar prices, comparison of products of the same brand, and limitation to regions to be compared.

The client sends a request to the product comparison service A. The product comparison service A takes over the subsequent process, and directly compares the products.

2. When the user wishes to contact a product provider via telephone, the user requests the service selection agent to select a service. The service selection agent first analyzes relevant meta information to determine that the type of contents is a telephone number.

The service selection agent sends the user identification and meta information, i.e. contents type of telephone number and character string of the telephone number, to the service selection server. The service selection server requests the meta information registration server, to obtain a service list related with the contents type of telephone number. The service filtering server filters the service list according to the user identification, and returns a network dialing service, provided by the operator of a network in which the user's mobile phone resides, to the service selection agent.

If employing an agent mode, the service selection agent acts as an agent of the client and sends a network dialing request to the network dialing service. The network dialing request includes parameters including the user identification and the hot line telephone number of the product provider. The network dialing service establishes a communication between the user's mobile phone and the hot line of the product provider.

The embodiments of the invention as described above are only exemplary, and are not intended to impose any limitation to the protection scope of the invention. Any modification, substitution or improvement made according to the principle of the invention should be covered within the protection scope of the invention.

What is claimed is:

1. A service selection method, comprising:
obtaining meta information according to contents specified by a client; when the contents specified by the client does not comprise meta information description, extracting a field utilized as content characteristics in the contents specified by the client, querying a preconfigured index relationship between label information and the content characteristics according to a user identification and the content characteristics represented by the field, to obtain the label information; matching the meta information registered by services with the label information through statistic and analysis on a public relationship, to obtain general match relationship of different credibility, to obtain the meta information corresponding to contents specified by the client;
requesting to query services matched with the meta information, to obtain a service list comprising service identifications of the services matched with the meta information from a service selection server; the service selection server obtain the service list as follows: after receiving user identification and meta information, the service selection server sending the user identification and meta information to a meta information registration server via a central controller, the meta information registration server querying services matched with the meta information, obtaining the service list comprising service identifications, and sending the service list to the service selection server via the central controller; the requests of the servers, and information transmission between the servers are controlled by the central controller;
converting the service list into a format recognizable by the client and providing the converted service list to the client;
obtaining a corresponding service identification according to acknowledgement information from the client; and
requesting interface and address information of a service server corresponding to the corresponding service identification, and providing the interface and address information to the client.

2. The service selection method according to claim 1, wherein before converting the service list into a format recognizable by the client and providing the converted service list to the client, the method further comprises:

reading user configuration information according to user identification saved in advance, filtering the service list when a user has configured service filtering, to obtain a new filtered service list.

3. The service selection method according to claim 2, wherein filtering the service list comprises:

reading a filtering policy according to the user identification, querying various information in the service list according to the filtering policy, filtering and sorting the service list according to a query result, and generating a new filtered service list.

4. The service selection method according to claim 1, wherein requesting to query the services matched with the meta information to obtain the service list comprising the service identifications comprises:

matching relationship between meta information and services saved in advance with the meta information, querying services meeting match conditions of the meta information according to a matching result, to obtain a service list comprising the service identifications and basic description information of the services.

5. The service selection method according to claim 4, wherein the relationship between meta information and services comprises one or more of the following:

relationship between meta information and particular services;

relationship between meta information and services registered by service providers; and relationship between meta information and frequently used services.

6. The service selection method according to claim 1, wherein extracting a field utilized as content characteristics in the contents specified by the client comprises:

extracting the fields from a syntax format of Hyper Text Mark-up Language, eXtensible Markup Language, and Embedding Resource Description Framework in XHTML, thereby forming the content characteristics of Resource Description Framework.

7. The service selection method according to claim 1, wherein requesting to query services matched with the meta information, to obtain a service list comprising service identifications of the services matched with the meta information comprises:

sending the obtained meta information to a meta information registration server, requesting to query services matched with the meta information;

receiving the service list, wherein the service list is sent by the meta information registration server.

8. The service selection method according to claim 7, wherein the meta information registration server queries, according to a match relationship between services and meta information, whether there are services meeting match conditions of the meta information by using the meta information.

9. The service selection method according to claim 8, wherein the match relationship between services and meta information includes: relationship between meta information and particular services configured in the service selection apparatus; relationship between meta information and services registered to the service selection apparatus by service providers; and relationship between meta information and services, frequently used by the users, registered to the service selection apparatus by users.

10. A service selection apparatus, comprising a service selection agent, a service selection server, a meta information registration server and a central controller:

the service selection agent is adapted to obtain meta information according to contents specified by a client, when the contents specified by the client does not comprise meta information description, extract a field utilized as content characteristics in the contents specified by the client, query a preconfigured index relationship between label information and the content characteristics according to a user identification and the content characteristics represented by the field, to obtain the label information; match the meta information registered by services with the label information through statistic and analysis on a public relationship, to obtain general match relationship of different credibility, to obtain the meta information corresponding to contents specified by the client; convert a service list into a format recognizable by the client and provide the converted service list to the client and obtain a corresponding service identification according to acknowledgement information from the client; request interface and address information of a service server corresponding to the corresponding service identification, and provide the interface and address information to the client;

the service selection server is adapted to send user identification and meta information received from the service selection agent to the meta information registration server via the central controller, requesting the service list based on the contents specified by the client, and send the service list to the service selection agent;

the meta information registration server is adapted to query services matched with the meta information, obtain the service list comprising service identifications, and send the service list to the service selection server via the central controller;

the central controller is adapted to control requests of the servers, and information transmission between the servers.

11. The service selection apparatus according to claim 10, further comprising:

a service filtering server, adapted to read a filtering policy according to pre-saved user identification when receiving a service filtering request from the service selection server, query various information in the service list sent from the service selection server via the central controller according to the filtering policy, filter and sort the service list according to a query result, generate a new filtered service list, and send the new filtered service list to the service selection server via the central controller.

12. The service selection apparatus according to claim 11, wherein the service selection server comprises:

a selection control unit, adapted to control process of service selection;

a service query interface, adapted to send the user identification and the meta information to the meta information registration server, obtain the service list comprising services identifications and basic description information of each service, and send the service list to the service selection agent, under the control of the selection control unit.

13. The service selection apparatus according to claim 12, wherein the service selection server further comprises:

an information management unit, adapted to save and manage user configuration information of service selection;

a filtering query interface, adapted to send the service list obtained by the service query interface to the service filtering server when the selection control unit reads the user configuration information saved in the information management unit and determines that a user has configured service filtering, to obtain a new filtered service list.

14. The service selection apparatus according to claim 11, wherein the service filtering server comprises:
   a filtering policy subscription unit, adapted to configure a personal filtering policy of a user;
   a filtering policy library, adapted to save the personal filtering policy of the user;
   a filtering processing unit, adapted to read a filtering policy from the filtering policy library, query various information in the service list according to the filtering policy, filter and sort the service list according to a query result, generate a new filtered service list, and send the new filtered service list to the service selection server via the central controller.

15. The service selection apparatus according to claim 14, wherein the service filtering server further comprises:
   an external filtering interface, adapted to provide an interface for external filtering services; wherein the service list is sent to an external filtering server via the interface, and a filtered service list is returned via the interface after the external filtering server processes the service list.

16. The service selection apparatus according to claim 10, wherein the service selection agent comprises:
   a contents analysis unit, adapted to collect and analyze the contents specified by the client, extract meta information when the contents specified by the client comprise meta information description; and extract content characteristics when the contents specified by the client do not comprise meta information description;
   an interaction acknowledge unit, adapted to convert the service list into a format recognizable by the client and provide the converted service list to the client, receive the acknowledgement information from the client and obtain the corresponding service identification;
   an interface query unit, adapted to request to obtain the interface and address information of the service server according to the corresponding service identification acknowledged by the client, and send the interface and address information to the client.

17. The service selection apparatus according to claim 16, wherein the contents analysis unit, the interaction acknowledge unit and the interface query unit are in a separated server; or all or part of the contents analysis unit, the interaction acknowledge unit and the interface query unit are at client side.

18. The service selection apparatus according to claim 10, wherein the meta information registration server comprises:
   a service and meta information relationship library, adapted to save and manage relationship between meta information and services;
   a service registration information library, adapted to save and manage service identifications and basic description information of services;
   a service query engine, adapted to match the relationship saved in the service and meta information relationship library with the meta information, query services meeting match conditions of the meta information according to a query result, search for corresponding basic description information in the service registration information library, and send the service list comprising service identifications and basic description information of the services meeting the match conditions to the service selection server via the central controller; and
   a service registration management unit, adapted to an interface for registration of meta information of services.

19. The service selection apparatus according to claim 10, wherein the meta information extraction server comprises:
   a content characteristic library, adapted to save and manage the relationship between meta information and content characteristics;
   a characteristic match engine, adapted to match with the relationship between meta information and content characteristics according to the content characteristics and the user identification, to obtain the corresponding meta information, and send the corresponding meta information to the service selection server via the central controller.

20. The service selection apparatus according to claim 19, wherein the meta information extraction server further comprises:
   a contents label library, adapted to save and manage the relationship between label information and content characteristics to be used by the characteristic match engine in querying according to the content characteristics and the user identification to obtain a relevant label;
   a label statistic and analysis unit, adapted to correspond labels to meta information registered by services through label statistic and language analysis, to establish relationship between meta information and label information to be used by the characteristic match engine in matching the obtained relevant label with the meta information registered by services, to obtain the corresponding meta information.

21. A service selection system, comprising a client application server, a service selection apparatus, and a service registration server; the service selection apparatus comprises a service selection agent, a service selection server, a meta information registration server and a central controller,
   the service selection agent is adapted to obtain meta information according to contents specified by a client, when the contents specified by the client does not comprise meta information description, extract a field utilized as content characteristics in the contents specified by the client, query a preconfigured index relationship between label information and the content characteristics according to a user identification and the content characteristics represented by the field, to obtain the label information; match the meta information registered by services with the label information through statistic and analysis on a public relationship, to obtain general match relationship of different credibility, to obtain the meta information corresponding to contents specified by the client; convert a service list into a format recognizable by the client and provide the converted service list to the client and obtain a corresponding service identification according to acknowledgement information from the client; request interface and address information of a service server corresponding to the corresponding service identification, and provide the interface and address information to the client;
   the service selection server is adapted to send user identification and meta information received from the service selection agent to the meta information registration server via the central controller, requesting the service list based on the contents specified by the client, and send the service list to the service selection agent;
   the meta information registration server is adapted to query services matched with the meta information, obtain the service list comprising service identifications, and send the service list to the service selection server via the central controller;

the central controller is adapted to control requests of the servers, and information transmission between the servers.

22. The service selection system according to claim 21, wherein the service selection apparatus further comprises:

a service filtering server, adapted to read a filtering policy according to pre-saved user identification when receiving a service filtering request from the service selection server, query various information in the service list sent from the service selection server via the central controller according to the filtering policy, filter and sort the service list according to a query result, generate a new filtered service list, and send the new filtered service list to the service selection server via the central controller.

* * * * *